(12) United States Patent
Garrault et al.

(10) Patent No.: US 8,196,075 B1
(45) Date of Patent: Jun. 5, 2012

(54) GENERATION OF INPUT/OUTPUT MODELS

(75) Inventors: Philippe Garrault, Saint Andre le Gaz (FR); Jennifer D. Baldwin, Boulder, CO (US); Richard J. LeBlanc, Longmont, CO (US); Premduth Vidyanandan, Denver, CO (US); Kenneth J. Stickney, Jr., Boulder, CO (US); Carrie L. Kisiday, Fort Collins, CO (US)

(73) Assignee: Xilinx, Inc., San Jose, CA (US)

( * ) Notice: Subject to any disclaimer, the term of this patent is extended or adjusted under 35 U.S.C. 154(b) by 206 days.

(21) Appl. No.: 12/639,270

(22) Filed: Dec. 16, 2009

(51) Int. Cl.
*G06F 17/50* (2006.01)

(52) U.S. Cl. ........ 716/104; 716/116; 716/117; 716/119; 716/122; 716/126

(58) Field of Classification Search .................. 716/116, 716/119, 117, 122, 126, 104
See application file for complete search history.

(56) References Cited

U.S. PATENT DOCUMENTS

| | | | | |
|---|---|---|---|---|
| 7,143,360 | B1 * | 11/2006 | Ogami et al. | 715/763 |
| 7,627,838 | B2 * | 12/2009 | Keswick | 716/132 |
| 7,788,620 | B1 * | 8/2010 | Xue et al. | 716/113 |
| 2003/0065863 | A1 * | 4/2003 | Wyland | 710/305 |

OTHER PUBLICATIONS

U.S. Appl. No. 12/053,407, filed Mar. 21, 2008, Baldwin et al.
Altera Corp., *Quartus II Handbook Version 9.1*, vol. II: *Design Implementation and Optimization*, Chapter 5, Nov. 2009, pp. 5-1 to 5-52, Altera Corp., San Jose, California, USA.
Altera Corp., *Quartus II Handbook Version 9.1*, vol. II: *Design Implementation and Optimization*, Chapter 7, Nov. 2009, pp. 7-1 to 7-44, Altera Corp., San Jose, California, USA.

* cited by examiner

*Primary Examiner* — Nghia Doan
*Assistant Examiner* — Brian Ngo
(74) *Attorney, Agent, or Firm* — LeRoy D. Maunu

(57) ABSTRACT

A process is provided for creating an input/output (I/O) model. A set of logical I/O pins of an unplaced and unrouted circuit design is determined. Pin placement is determined for one or more of the logical I/O pins on device pins of a target device. An I/O pin profile for each of the logical I/O pins is determined. A plurality of I/O pin models available on the target device are input and an I/O pin model is selected from the plurality of I/O pin models for each of the logical I/O pins according to the respective I/O pin profiles. An I/O model is generated including each selected I/O pin model within the I/O model. The generated I/O model is stored in a processor readable storage medium.

18 Claims, 7 Drawing Sheets

GENERATION OF INPUT/OUTPUT MODELS

FIELD OF THE INVENTION

The embodiments disclosed herein relate to integrated circuit devices. More particularly, the embodiments relate to creating an input/output (I/O) model document specifying I/O pin models for a circuit design.

BACKGROUND

Circuit designs implemented within integrated circuit devices (ICs) are routinely tested for functionality. It is common practice to simulate circuit designs for ICs using any of a variety of different Electronic Design Automation (EDA) tools. Typically, such circuit designs are to be used within a larger system. For example, the IC usually is mounted upon a circuit board with one or more other ICs and various other electronic components. It then becomes necessary to ensure that each IC interacts with each other IC, on the circuit board level, appropriately.

As I/O switching frequencies have increased and voltage levels have decreased, accurate analog simulation of I/Os has become an essential part of modern high-speed digital system design. By accurately simulating the I/O buffers, termination, and circuit board traces, designers can significantly shorten their time-to-market of new designs. By identifying signal integrity related issues at the beginning of the design cycle, the number of board and/or IC fixes is decreased.

Traditionally SPICE analysis has been used extensively in areas like IC design, where a high level of accuracy is required. However, in the printed circuit board (PCB) and systems domain, there are several disadvantages to the SPICE method, both for the user and the device vendor. Since SPICE simulations model a circuit at transistor level, it is necessary for the SPICE models to contain detailed information about the circuit and process parameters. For most IC vendors, this type of information is regarded as proprietary and there is usually a great deal of resistance against making the models public.

Although SPICE simulation accuracy is typically very good, a significant limitation with any simulation method is simulation speed. Simulation speeds are particularly slow for transient simulation analysis, which is most often used when evaluating signal integrity performance. SPICE simulation has a further disadvantage in that not all SPICE simulators are fully compatible. Oftentimes, default simulator options are not the same in different SPICE simulators. As there are some very powerful options that control accuracy, convergence, and the algorithm type, any options that are not consistent may give rise to poor correlation in simulation results across different simulators. In addition, because of the different variants of SPICE, these models are often incompatible between simulators. Thus, models must be extracted for a specific simulator. An alternative to SPICE simulation is the use of an Input/Output model (I/O model) for simulation.

I/O models express the I/O behavior of individual pins of an IC according to an I/O model standard and can be used to simulate I/O interaction between ICs and other circuits. One widely used I/O model standard is IBIS (I/O Buffer Information Specification). IBIS allows access to accurate I/O buffer models while protecting intellectual property. The IBIS specification is maintained by the EIA/IBIS Open Forum, which has members from a large number of IC and EDA vendors. Other I/O models include IBIS-AMI, VHDL-AMS, Verilog-A, and I/O modeling within SPICE.

The core of the IBIS model consists of a table of current versus voltage and timing information. This is very attractive to the IC vendor as the I/O internal circuit is treated as a black box. This way, transistor level information about the circuit and process details is not revealed.

Models that specify the behavior of I/O pins for the IC can be created that conform to IBIS or another available I/O specification. Using I/O models has a great advantage to the user in that simulation speed is significantly increased over full SPICE simulation, while accuracy is only slightly decreased. I/O pin models that are created for the I/O pins of an IC can be used to implement transmission line-like simulation of the various signals exchanged between I/O pins of the ICs on a circuit board.

Currently I/O models are generated from completed circuit designs. This process creates a bottleneck in the development cycle, because other components or circuit boards which interact with the circuit design cannot be simulated to verify I/O behavior until the I/O model is generated. The present invention may address one or more of these issues.

SUMMARY

In one of the various contemplated embodiments of the invention, a process is provided for creating an input/output (I/O) model. A set of logical I/O pins of an unplaced and unrouted circuit design is determined. Pin placement is determined for one or more of the logical I/O pins on device pins of a target device. An I/O pin profile for each of the logical I/O pins is determined. A plurality of I/O pin models available on the target device are input and an I/O pin model is selected from the plurality of I/O pin models for each of the logical I/O pins according to the respective I/O pin profiles. An I/O model is generated including each selected I/O pin model within the I/O model. The generated I/O model is stored in a computer readable storage medium.

In another embodiment, an article of manufacture is provided. The article is characterized by a computer readable storage medium storing processor-executable instructions causing one or more processors to process a circuit design. The instructions when executed by a processor cause the processor to determine a set of logical I/O pins of an unplaced and unrouted circuit design and determine pin placement of one or more of the logical I/O pins on device pins of a target device. The instructions further cause the processor to determine an I/O pin profile for each of the logical I/O pins, input a plurality of I/O pin models available on the target device, and select an I/O pin model from the plurality of I/O pin models for each of the logical I/O pins according to the respective I/O pin profiles. The instructions additionally cause the processor to generate an I/O model including each selected I/O pin model within the I/O model and store the I/O model in a processor readable storage medium.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION

A circuit design may be implemented using several alternate device packages. The designation of a particular target device will typically specify a particular type of package within which circuitry of a design will be realized. For example, the target device can be a programmable logic device (PLD), such as a field programmable gate array (FPGA), having a particular type of packaging. A target architecture, by comparison, can reference the underlying circuitry, but be agnostic with respect to the type of package within which the circuitry is disposed. Accordingly, circuitry having a given target architecture may be disposed in any of a variety of different packages, resulting in a plurality of different target devices, each having the same architecture. FPGAs include I/O resources for each device I/O pin. These resources typically support multiple I/O standards and have different package parasitic characteristics, such as resistance, capacitance, and inductance, which vary from device to device and pin to pin depending on the I/O standard implemented or package characteristics.

I/O models express the I/O behavior of individual pins of an IC according to an I/O model standard and can be used to simulate I/O interaction between an IC and other circuits such as a printed circuit board (PCB). For each target device pin, an I/O model details which circuit design I/O signal will be connected to the pin as well as the I/O standard that will be implemented by the I/O resources of the pin. Per pin parasitic information may also be included for each device pin. For clarity, circuit design I/O signals are referred to as logical I/O pins. Physical I/O pins of the target device are referred to as device pins. Logical I/O pins that are mapped or assigned to specific device pins are referred to as placed pins and logical I/O pins that are not assigned or mapped to specific device pins are referred to as unplaced pins.

Current I/O model generators acquire logical I/O pin definitions and placement information from a placed and routed circuit design file. This requires all logical pins corresponding to the I/O signals of a circuit design to be mapped to specific pins of the target device. If one or more logical I/O pins are unplaced, an I/O model of the design cannot be generated. A design is mapped into a netlist, which is parsed to determine pin placement and I/O standard of each pin. After the I/O model is generated, circuitry and components that are compatible with the I/O model can be designed and simulated against the I/O model.

Figure 1:
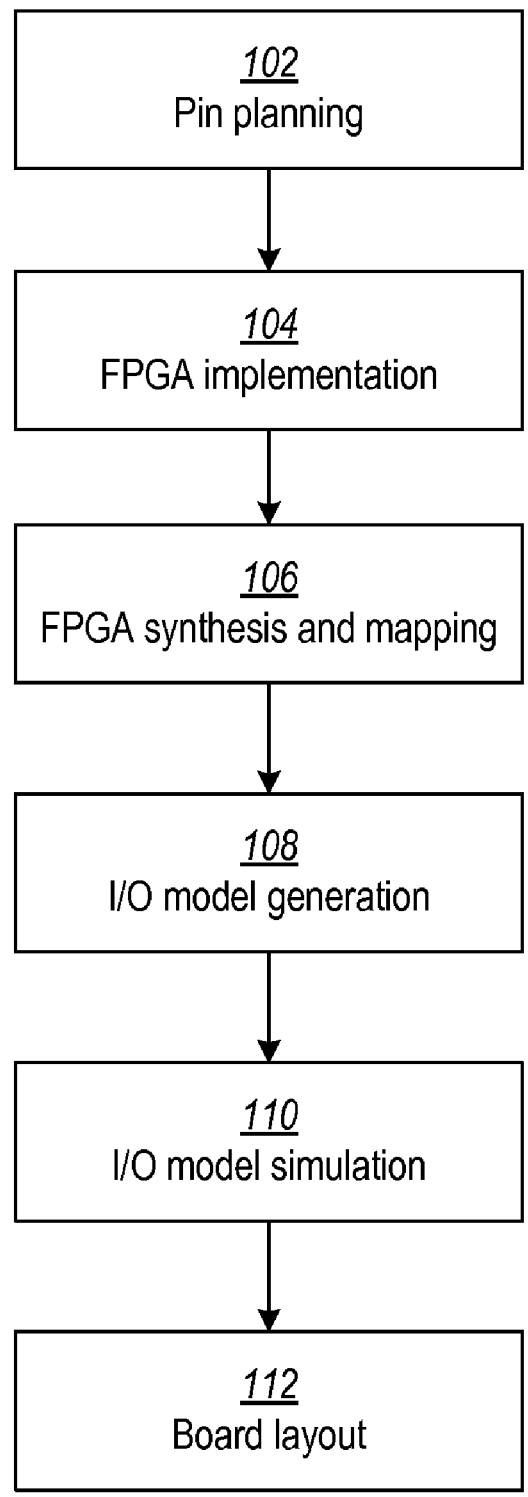
FIG. 1 shows a flowchart process of a development cycle, wherein an I/O model is generated after physical design of the circuit is complete.

FIG. 1 is a flowchart illustrating the processes of the current development cycle. The architecture of I/O signals and standards that will be implemented in a design is defined in pin planning at step 102. The FPGA design is developed at step 104 using the I/O interface architecture defined at step 102. The completed FPGA design is synthesized and mapped into a netlist at step 106. An I/O model is generated from the netlist at step 108. The I/O model can then be used to simulate and verify I/O performance of the circuit along with other circuits and circuit boards at step 110. The simulation results are used to debug and optimize the additional components and circuit boards at step 112.

However, this design flow places a bottleneck in the design process, because other components or circuit boards which interact with the circuit design cannot be simulated to verify I/O behavior until the circuit design has been completed, synthesized, and mapped into a netlist.

The present invention provides for the generation of I/O models containing unplaced logical I/O pins. Because unplaced pins can be incorporated, an I/O model can be generated prior to completion of the circuit design—thus enabling other circuits such as PCBs to be designed, tested, and verified in parallel with the development of the circuit design. In this manner, the development cycle and time to market can be reduced. Various different embodiments of the present invention generate I/O models at various stages in the product development. An I/O model may be generated during pin planning of the circuit design, after pin planning, after synthesis, or any time before the circuit design is placed and routed.

Figure 2:
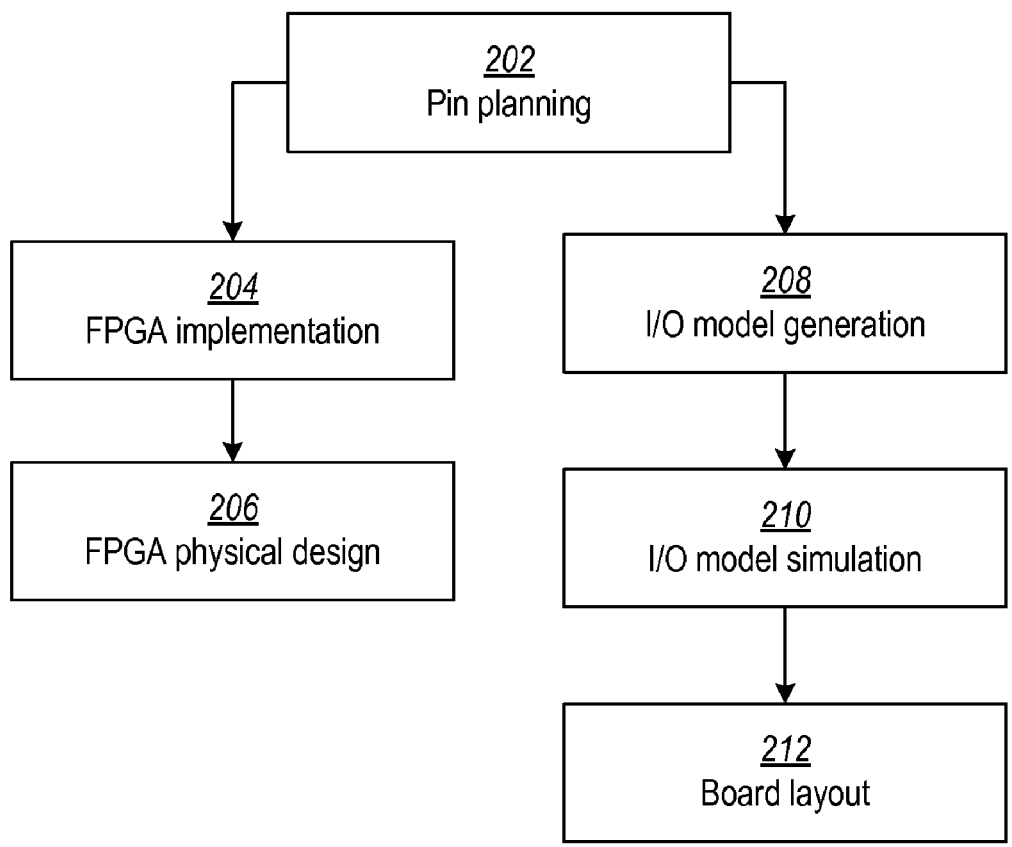
FIG. 2 shows a flowchart process of a development cycle, wherein an I/O model is generated during pin placement.

FIG. 2 shows a flowchart of a design process in which an I/O model is generated after the pin planning development stage in accordance with various embodiments of the invention. The architecture of I/O signals and standards that will be implemented in a design is defined in pin planning at step 202. A supporting target device is chosen and one or more logical I/O pins may be assigned to specific device pins.

Following pin planning, the present invention allows an I/O model to be generated from the defined pin planning data at step 208. The I/O model simulation and board layout in steps 210 and 212 can be performed in parallel with FPGA development in steps 204 and 206. By developing the FPGA design and board layout in parallel, the development cycle and time to market can be shortened.

Figure 3:
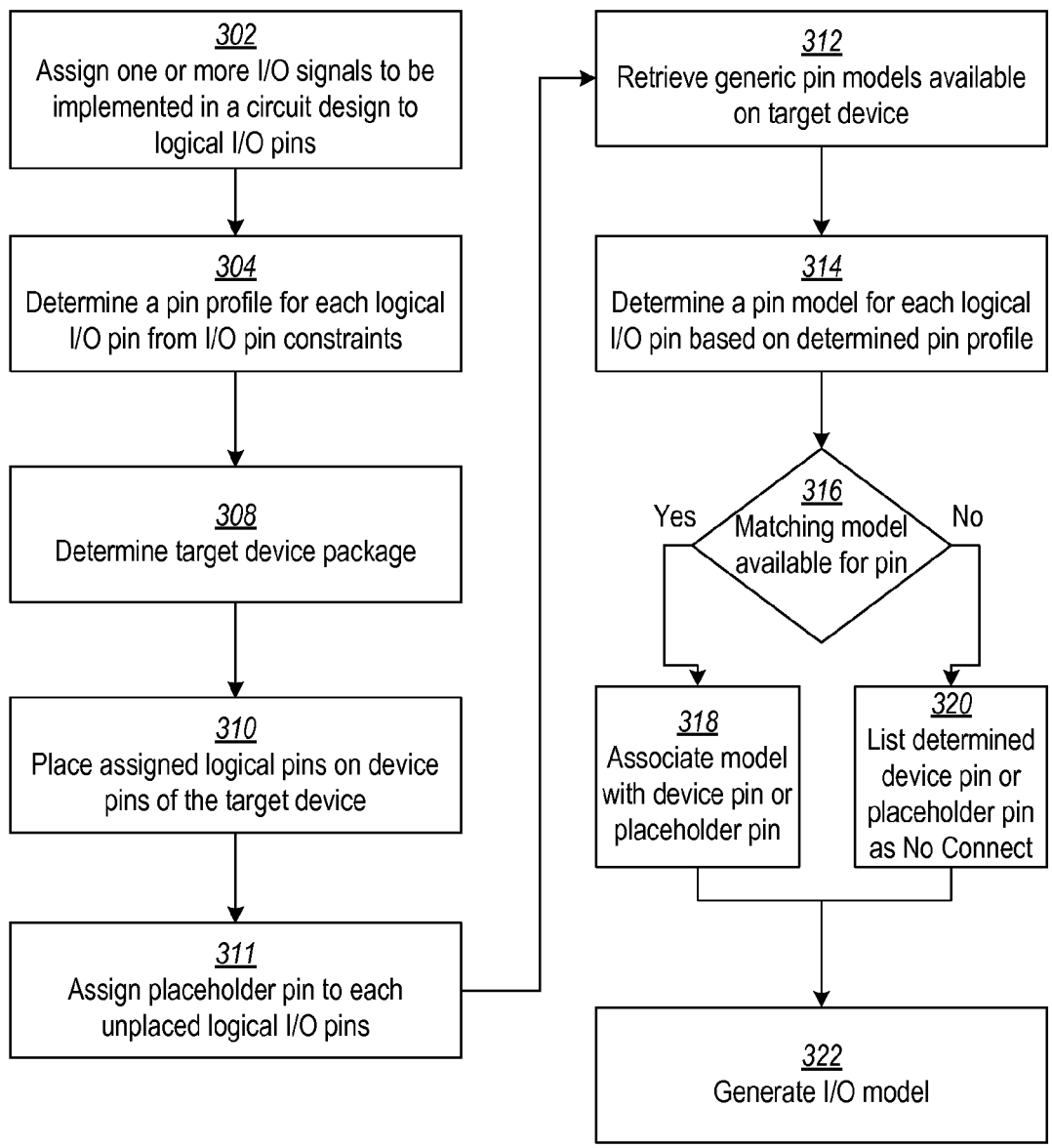
FIG. 3 shows a flowchart of a process for constructing an I/O model during pin planning.

FIG. 3 shows a flowchart of a process for generating an I/O model during pin placement for a circuit design in accordance with several embodiments of the invention. Logical I/O pins are defined for I/O signals of the circuit design at step 302. The I/O signals may be determined by parsing one or more HDL files, pinout definition files, or other files that indicate I/O signals of the circuit design. If no design or definition files are available, or if the circuit design is incomplete, the user may create a pinout definition indicating I/O signals that will be incorporated into a circuit design at a later time.

A pin profile is created for each logical I/O pin at step 304. The pin profile is determined from I/O pin constraints placed on the design such as: I/O standard; timing; slew; drive; input, output, and differential termination; bank; die and package edge and direction constraints. Pin constraints of the logical I/O pins are obtained by inputting one or more constraints files or may be selected by the user using a graphical user interface.

A target device package is determined at step 308. The user input can specify a specific target device package or, in some embodiments, a target device package can automatically be selected from a review of the circuit design or defined pinout. Placement of one or more pins is determined at step 310. It is understood that pin placement information can be acquired from a variety of sources and supplemented by the user. Determining pin placement is understood to include: 1) extracting pin placement information from the circuit design file; 2) reading pin placement information from a pin placement file generated by pin planning tool; and/or 3) prompting the user to select the placement of one or more logical I/O pins. It is understood that not all logical I/O pins need to be placed. Designers may place the most critical pins and rely on auto-placement of the others. This process would allow for I/O model simulation of the specifically placed critical pin placements without placing all pins. Specifically placed pins may include detailed per-pin characteristics in the generated model such as: resistance, capacitance, and inductance data. Placeholder pin names are assigned to unplaced pins at step 311.

Pin placement, pin constraints, and logic I/O pin definition information may not be available in the pin planning process from a single source. I/O pins may be assigned to one or more core blocks from multiple vendors. Because this information may not be available in the circuit design file, current model generators are prevented from including logic cores block pins in the I/O model. It will be appreciated that logic cores are sometimes referred to as "intellectual property (IP) cores." Current I/O generation methods list pins assigned to logic core blocks as no-connects (NC) in the generated design-specific I/O Model. NC indicates that a device pin is not connected to a signal line of the signal design. Because logic I/O pin definitions may be acquired from multiple source files, the present invention allows I/O models to be generated that include pins assigned to logic core blocks.

Generic I/O pin models supported on the target device package are retrieved at step 312. In various embodiments of the invention, I/O pin models can be retrieved from a website maintained by the manufacturer of the target device. An I/O pin model is determined for each logical I/O pin at step 314 based on the respective pin profile of each logical I/O pin. An I/O pin model can specify one or more parameters and parameter values for an I/O pin available in the target architecture. The parameters can include, for example, the I/O standard used, the slew rate, the direction of the I/O pin, input, output, bi-directional termination, drive strength, the supply voltage of the I/O pin, the location of the I/O pin on the package, e.g., a particular bank in which the I/O pin is located such as left, right, top, or bottom, etc. These parameters, collectively, can determine the I/O pin profile of the I/O pin.

Each of the I/O pin models in the generated I/O model can include at least a minimal amount of package parasitic data. The package parasitic document can specify more accurate and complete electrical behavior information for specific I/O pins of a target device. Generic package parasitic information for a device package may also be included in the generated I/O model. The generic package parasitic document can include package parasitic data for a plurality of different configurations available for a given target device package. For example, such minimal package parasitic data can be expressed in terms of a minimum and a maximum parasitic capacitance values that can be applied across all I/O pin models. That is, the general package parasitic information does not vary from one I/O pin model to the next even when such I/O pin models have different I/O pin profiles.

If an I/O model matching the pin profile is available, at decision step 316, the determined I/O pin model is associated with the device pin or placeholder pin corresponding to the logical I/O pin at step 318. If no model meeting the constraints of the pin profile is available, the device pin or placeholder pin corresponding to the logical I/O pin is listed as a "No Connect." The assigned I/O pin model and corresponding parasitic data of each of the logical I/O models are placed into an I/O model of the circuit design at step 322. In various embodiments of the invention, the user may select a subset of pins to include in the I/O model of the circuit design. The generated I/O model may include: 1) placed pins, 2) unplaced pins, or 3) placed and unplaced pins.

If package parasitic data is to be generated, such data can be added to a design-specific package parasitic document. The design-specific I/O model document can include a reference or pointer to the design-specific package parasitic document. Further, each individual I/O pin model of the design-specific I/O model document can include a pointer or reference to the parasitic data within the design-specific package parasitic document that is associated with that I/O pin model. The package parasitic data that is associated with the selected I/O pin model can be selected and included within the design-specific package parasitic document. Alternately, the I/O pin models can include references or pointers to the package parasitic data within the generic package parasitic document for each respective I/O pin model. In various embodiments of the invention the package parasitic information can be included directly in the I/O model document rather than in a separate document.

Figure 4:
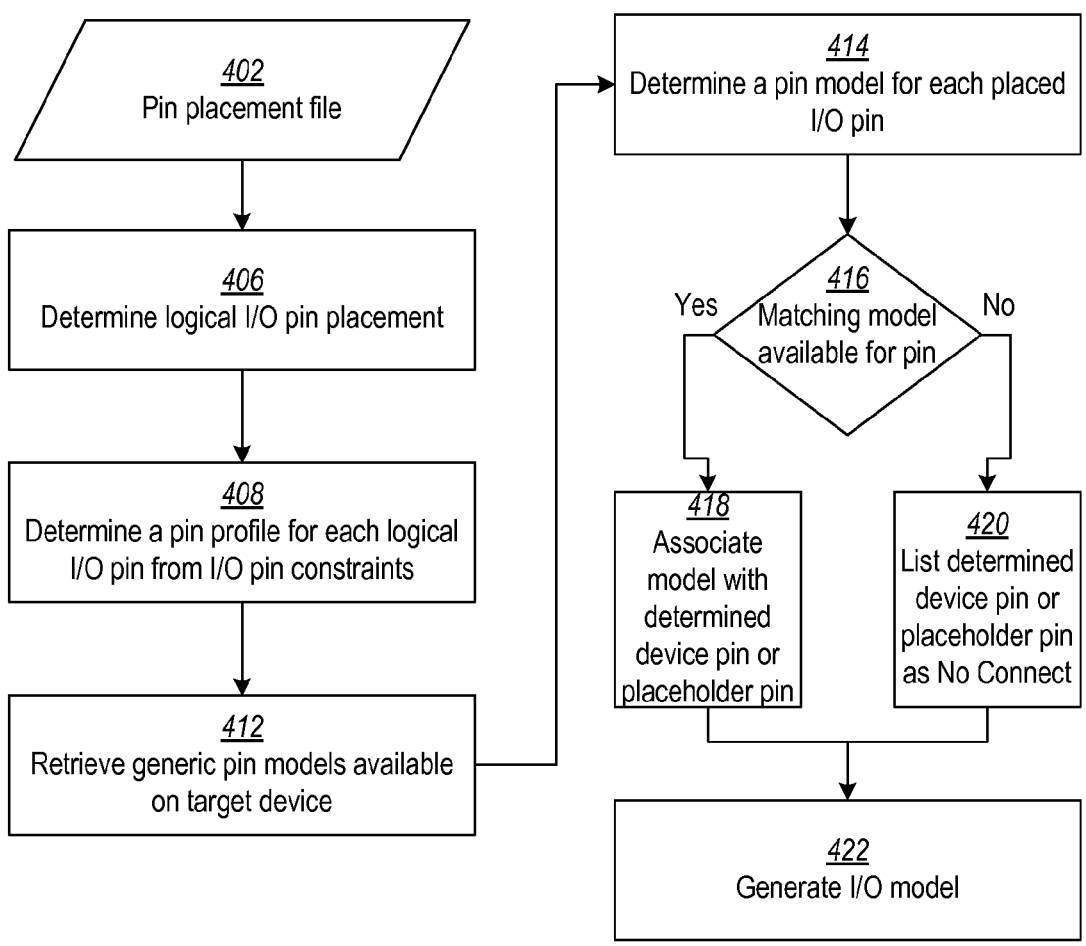
FIG. 4 shows a flowchart of a process for constructing an I/O model after pin planning is completed.

FIG. 4 is a flow chart illustrating a method of generating an I/O model for a circuit design after the pin planning stage of development. The target device package, pin placement, and logic I/O pin definition information is obtained from the pin placement file 402 at step 406. I/O pin information in the pin placement file may additionally be supplemented by the user at step 406. Depending on the pin planning utility used to generate the pin placement file, I/O pin constraints may be included as well. If I/O pin constraints are not included, the pin constraints are acquired from one or more constraint files as shown in FIG. 3.

A pin profile is created for each logical I/O pin at step 408. Generic I/O pin models supported on the target device package are retrieved at step 412. An I/O pin model is determined for each logical I/O pin at step 414 based on the respective pin profile of each logical I/O pin. If an I/O model matching the pin profile is available, at decision step 416, the determined I/O pin model is associated with the device pin or placeholder pin assigned to the logical I/O pin at step 418. If none of the I/O pin models meet the constraints of the pin profile, the device pin or placeholder pin assigned to the logical I/O pin is listed as a "No Connect" at step 420. An I/O model of the circuit design including parasitic information and each of the I/O pin models assigned to the device or placeholder pins is generated at step 422.

Figure 5:
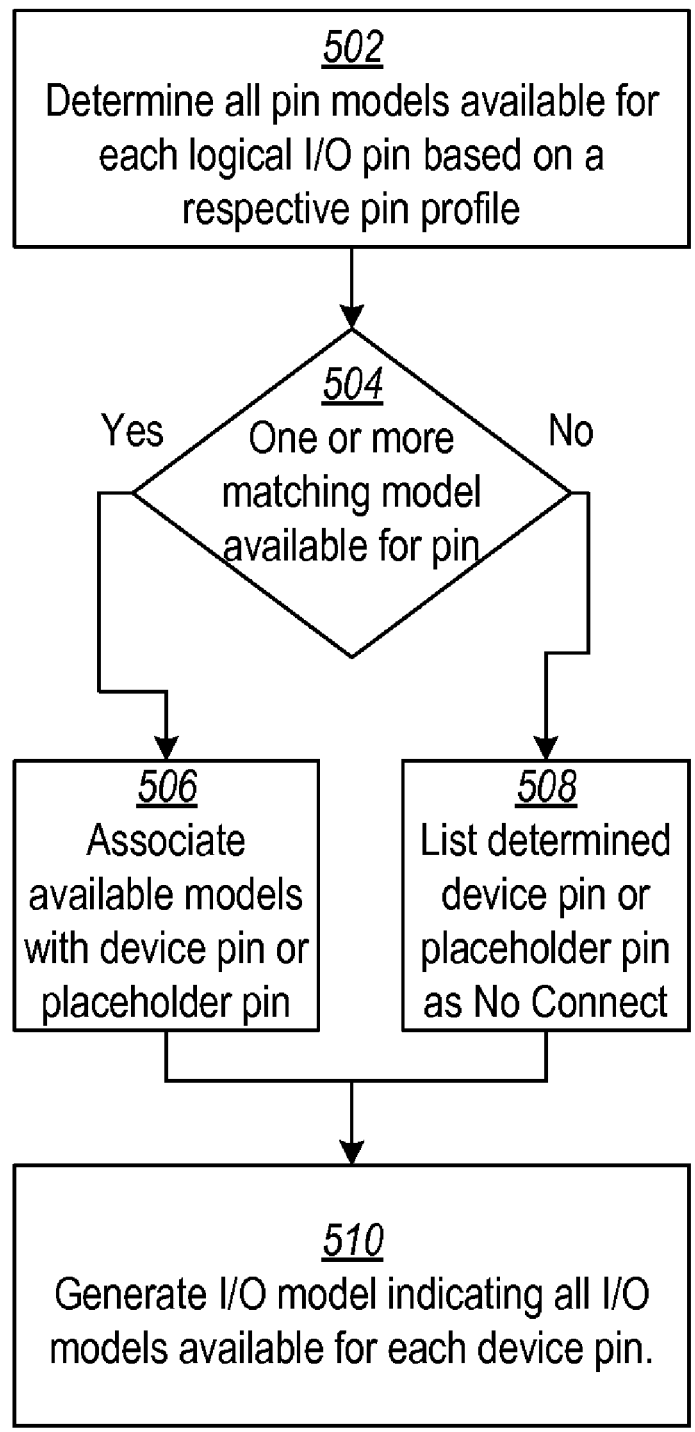
FIG. 5 illustrates a flowchart of a process for constructing an I/O model that includes multiple I/O pin model options for various I/O pins.

I/O characteristics are dependent upon the device and package chosen. FPGA I/O programmability allows a designer to explore different possible options in an automated way to achieve the desired performance and power for each interface with other components on the board. In accordance with various embodiments of the invention, multiple I/O pin models matching I/O pin constraints can be included in the generated I/O model FIG. 5 is a flowchart of a process for generating an I/O model for a circuit design that includes multiple I/O pin models for one or more logical I/O pins. Logical I/O pins are determined, placed, pin profiles are created, and generic I/O pin models are retrieved as shown in FIGS. 3 and 4. For each logical I/O pin, all generic I/O pin models matching the respective pin profile are determined at step 502. If one or more I/O models matching the pin profile of a logical I/O pin are available, at decision step 504, the determined I/O pin models are each associated with the device pin or placeholder pin assigned to the logical I/O pin at step 506. If no model meeting the constraints of the pin profile is found, the device pin or placeholder pin corresponding to the logical I/O pin is listed as a "No Connect" at step 508. The assigned I/O pin models and corresponding parasitic data of each of the assigned I/O models are placed into the generated I/O model of the circuit design at step 510.

The process may generate a single I/O model including all possible choices for a given pin. A model index or selector mechanism may be incorporated into the I/O model to allow a simulation runtime environment to select from the available I/O pin models. Alternately, the process may generate and output an I/O model for each I/O pin model option. In addition to including multiple I/O pin models supported on a target device for each logical I/O pin, various embodiments of the invention may include model data for multiple target devices or multiple target configuration modes in the generated I/O model.

In various embodiments of the invention, the I/O model generation process may check to see if an I/O pin model has already been included within the I/O model. If the I/O model has already been included, an index can be marked to indicate device I/O pins or placeholder pins that are associated with each unique I/O pin model. If a copy of the determined I/O pin model is not already included in the I/O model, the I/O pin model is added to the I/O model and index.

Figure 6:
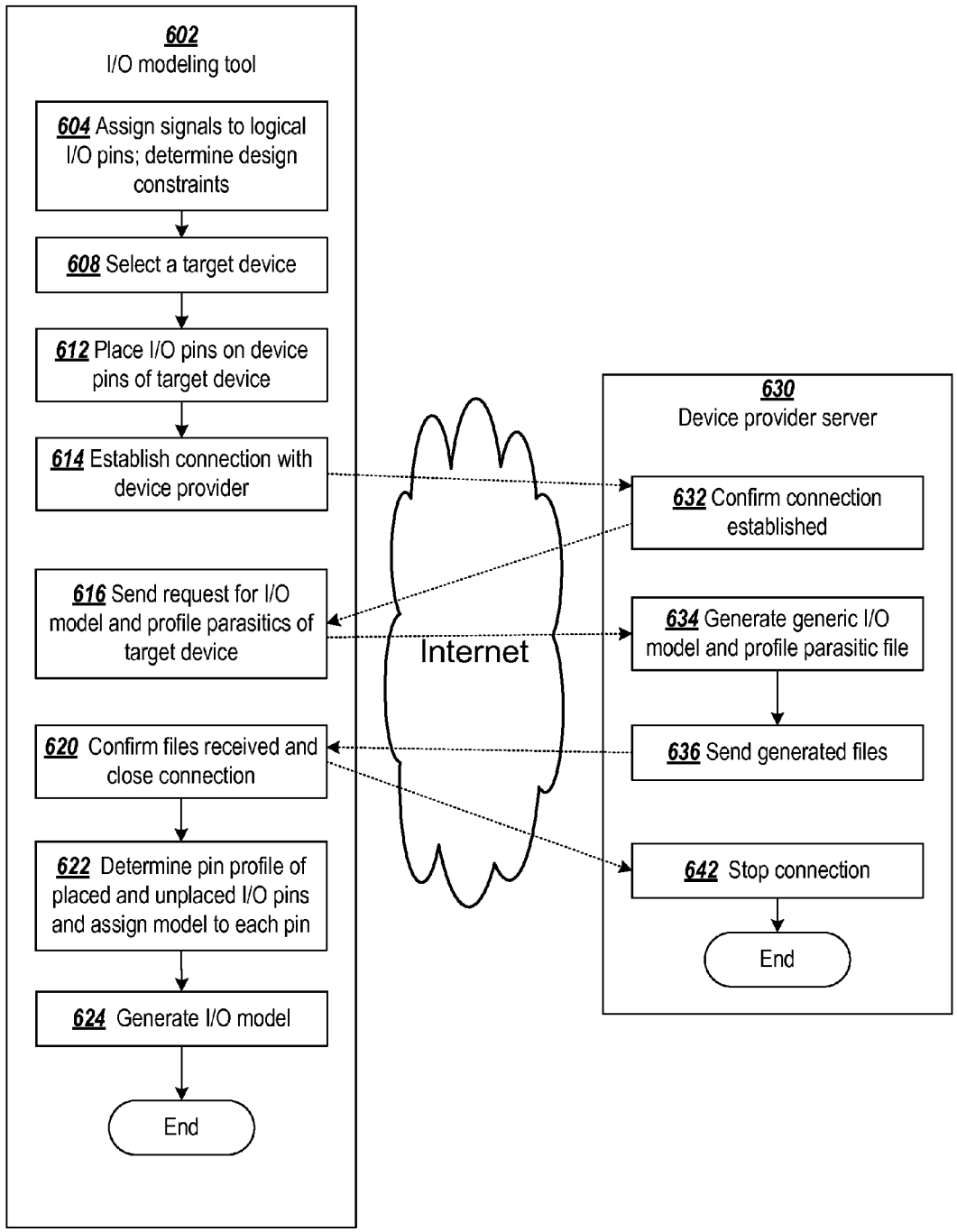
FIG. 6 illustrates a flowchart of a process for retrieval of I/O models and pin profiles from a remote server in accordance with various embodiments of the invention.

The most recent version of the supported I/O pin models and corresponding generic package parasitic documents for the target device package can be retrieved from a device provider server. FIG. 6 is a flowchart of a process for generating an I/O model of a circuit design with I/O pin models retrieved from a device provider server. The I/O modeling process is initiated by I/O modeling tool 602. Logical I/O pins are assigned to I/O signals and pin profiles are determined at step 604. A target device package is selected at 608. Logical I/O pins are placed on device pins at step 612.

To retrieve generic I/O pin models and package parasitic, I/O modeling tool 602 establishes a connection with the device provider server 630. After device provider server 630 confirms the connection is established at step 632, I/O modeling tool 602 sends a request for I/O models and profile parasitic corresponding to the selected target device at step 616. Depending upon the information requested, the provider server 630 can send the generic I/O model document, package parasitic, or both. While such data is represented independently, it should be appreciated that some specifications, e.g., IBIS, allow the I/O pin models and the package parasitic data to be combined into a single, larger document.

Accordingly, if so configured, the embodiments disclosed herein can provide a single download including both the I/O models, having integrated package parasitic data. After the request is received, device provider server generates generic I/O models and profile parasitic at step 634 and transmits generated files to I/O modeling tool at step 636. After I/O models are received, I/O modeling tool sends confirmation that files were received and closes the connection at step 620. After confirmation is received by device provider server 630, the connection is stopped at step 642. The I/O modeling tool 602 determines pin profiles of placed and unplaced I/O pins and assigns I/O pin models to each pin at step 622. An I/O model is generated at step 624.

The device provider site 630, for example, can be a Website or other remotely located, network accessible computer system from which a generic I/O model document and/or a generic package parasitic document can be downloaded. It is understood that numerous network transfer protocols may be used to establish, maintain, and route connections including: TCP/IP, UDP, NFS, ESP, SPX, etc. It is also understood that network transfer protocols may utilize one or more lower layers of protocol communication such as ATM, X.25, or MTP, and on various physical and wireless networks such as, Ethernet, ISDN, ADSL, SONET, IEEE 802.11, V.90/v92 analog transmission, etc.

The I/O pin models can be specified in, or formatted according to, an industry standard specification that is readable and accessible by parties other than the provider of a target device or architecture, e.g., third parties. The I/O model document that is created can specify an I/O pin model for each I/O pin of a selected target device or a target architecture that is used by a circuit design. The present invention is understood to be applicable to various I/O model standards such as: IBIS, IBIS-AMI, VHDL-AMS, Verilog-A, I/O modeling within SPICE, etc. Other models that encompass other open, or industry standard, specifications as well as proprietary languages or standards can be used.

Figure 7:
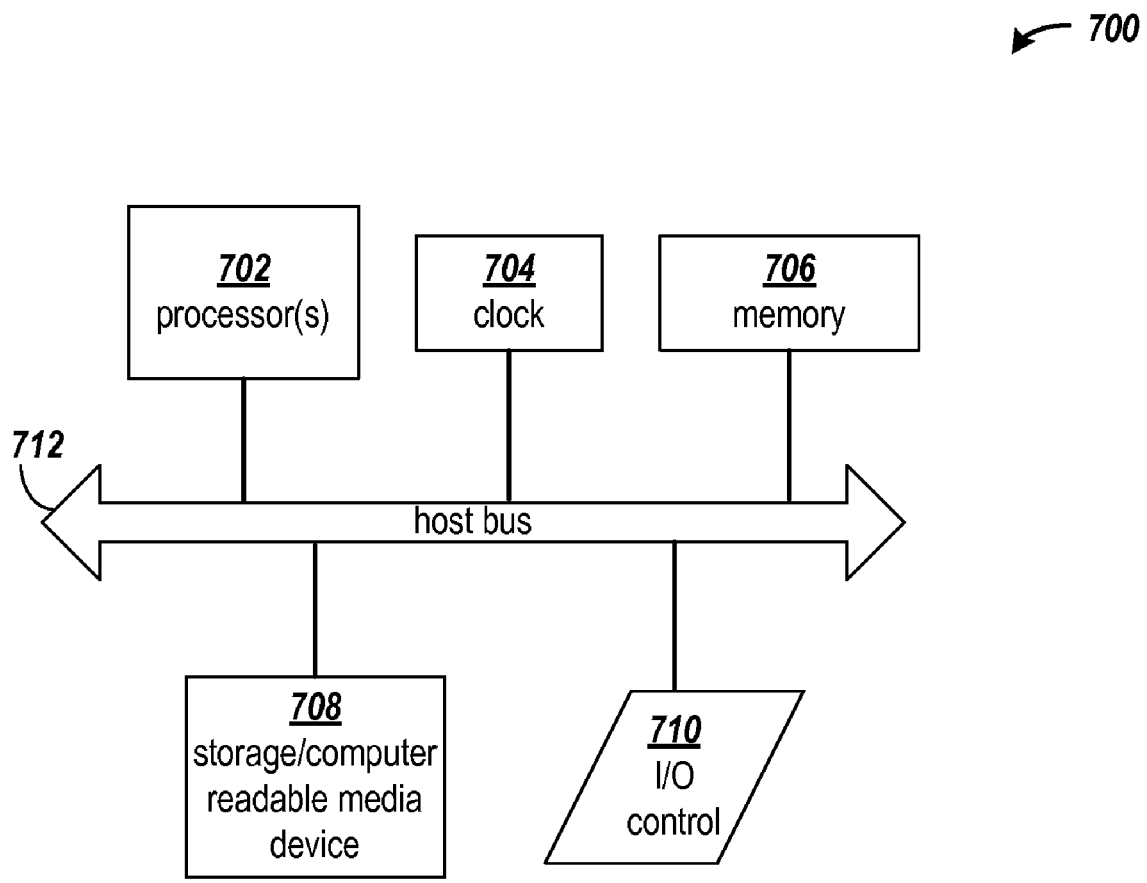
FIG. 7 shows a block diagram of a computing architecture for hosting the various processes of the invention.

FIG. 7 is a block diagram of an example computing arrangement, which may be configured to implement the processes described herein. Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of the present invention encoded in a processor executable format, may be stored and provided via a variety of computer-readable storage media or delivery channels such as magnetic or optical disks or tapes, electronic storage devices, or as application services over a network.

Processor computing arrangement 700 includes one or more processors 702, a clock signal generator 704, a memory unit 706, a storage unit 708, and an input/output control unit 710 coupled to host bus 712. The arrangement 700 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 702 may be one or more general-purpose processors, or a combination of one or more general-purpose processors and suitable co-processors, or one or more specialized processors (e.g., RISC, CISC, pipelined, etc.).

The memory arrangement 706 typically includes multiple levels of cache memory, a main memory. The storage arrangement 708 may include local and/or remote persistent storage such as provided by magnetic disks (not shown), flash, EPROM, or other non-volatile data storage. The storage unit may be read or read/write capable. Further, the memory 706 and storage 708 may be combined in a single arrangement.

The processor arrangement 702 executes the software in storage 708 and/or memory arrangements 706, reads data from and stores data to the storage 708 and/or memory 706 arrangements 706, and communicates with external devices through the input/output control arrangement 710. These functions are synchronized by the clock signal generator 704. The resource of the computing arrangement may be managed by either an operating system (not shown), or a hardware control unit (not shown).

The present invention is thought to be applicable to a variety of systems for generating I/O models. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of creating an input/output (I/O) model, comprising:
   determining a set of logical I/O pins of an unplaced and unrouted circuit design;
   determining pin placement of one or more of the logical I/O pins of the unplaced and unrouted circuit design on device pins of a target device;
   determining a respective I/O pin profile for each of the logical I/O pins;
   inputting a plurality of I/O pin models available for the device pins of the target device, each I/O pin model specifying a different respective set of one or more pin parameter values for simulation of I/O behavior of an I/O pin;
   selecting an I/O pin model from the plurality of I/O pin models for each of the logical I/O pins based on pin parameter values of the I/O pin model matching the respective I/O pin profile;
   wherein selecting an I/O in model from the plurality of I/O in models for each placed logical I/O pin includes: locating an I/O pin model from the plurality of I/O models having an I/O pin profile matching the determined I/O pin profile of the placed logical I/O pin; and creating an association between the placed logical I/O pin and the located I/O pin model;
   generating, by a programmed processor, an I/O model including each selected I/O pin model within the I/O model;
   inputting a generic package parasitic document specifying at least partial package parasitic information for the target device;
   selecting at least a portion of the package parasitic information for one or more selected I/O pin models within a particular package parasitic document; and
   storing the I/O model and particular package parasitic document in a non-transitory processor readable storage medium.

2. The method of claim 1, wherein:
   a subset of the set of logical I/O pins, including at least one logical I/O pin, are not placed on device pins of the target device; and
   the generated I/O model excludes I/O pin models corresponding to the I/O pins placed on device pins.

3. The method of claim 1, wherein:
   one or more of the logical I/O pins are not placed on device pins of the target device; and
   the generated I/O model excludes I/O pin models corresponding to the I/O pins not placed on device pins.

4. The method of claim 1, wherein:
   one or more of the logical I/O pins are not placed on device pins of the target device; and
   the generated I/O model includes I/O pin models corresponding to one or more logical I/O pins placed on device pins and I/O pin models corresponding to the one or more of the logical I/O pins not placed on device pins.

5. The method of claim 1, wherein:
   selecting an I/O pin model for each of the placed logical I/O pins includes determining whether each pin can be matched to one of the plurality of I/O pin models based on a determined pin profile; and
   the generated I/O model includes the placed logical I/O pins that cannot be matched to one of the plurality of I/O pin models as no-connect pins.

6. The method of claim 1, wherein determining an I/O pin profile for each of the logical I/O pins includes:
   determining I/O pin constraints corresponding to each logical I/O pin;
   identifying parameters of each logical I/O pin from the determined I/O pin constraints; and
   determining an I/O pin profile for each logical I/O pin according to the parameters of the logical I/O pin.

7. The method of claim 1, wherein determining pin placement of the one or more logical I/O pins includes reading a pin-placement file of the unplaced and unrouted circuit design.

8. The method of claim 1, further comprising assigning the logical I/O pins to respective I/O signals of the unplaced and unrouted circuit design.

9. The method of claim 1, wherein determining design constraints includes:
   inputting one or more constraint files; and
   determining design constraints from one or more constraint files.

10. The method of claim 1, wherein inputting a plurality of I/O pin models and I/O pin profiles available on the target device includes downloading the plurality of I/O pin models and I/O pin profiles from a provider site.

11. The method of claim 1, wherein the set of logical I/O pins includes I/O pins corresponding to a logic core incorporated in the unplaced and unrouted circuit design.

12. The method of claim 1, further comprising selecting an additional I/O pin model from the plurality of I/O pin models for at least one of the placed logical I/O pins according to the respective I/O pin profile; and
    wherein the generated I/O model includes the additional I/O pin model.

13. The method of claim 1, further comprising inputting package parasitic data for device pins of the target device; and
    wherein the generated I/O model includes package parasitic data.

14. The method of claim 1, wherein:
    all logical I/O pins are placed on device pins of the target device;
    the generated I/O model includes at least one I/O pin model corresponding to each of the logical I/O pins; and
    the unplaced and unrouted circuit design is an unmapped circuit design.

15. A method of creating an input/output (I/O) model, comprising:
    determining a set of logical I/O pins of an unsynthesized circuit design;
    determining pin placement of one or more of the logical I/O pins of the unsynthesized circuit design on device pins of a target device;
    determining a respective I/O pin profile for each of the logical I/O pins; inputting a plurality of I/O pin models available for the device pins of the target device, each I/O pin model specifying a different respective set of one or more pin parameter values for simulation of I/O behavior of the I/O pin;
    selecting an I/O pin model from the plurality of I/O pin models for each of the logical I/O pins according to based on pin parameter values of the I/O pin model matching the respective I/O pin profile;
    wherein selecting an I/O pin model from the plurality of I/O pin models for each placed logical I/O pin includes: locating an I/O pin model from the plurality of I/O models having an I/O in profile matching the determined I/O in profile of the placed logical I/O pin; and creating an association between the placed logical I/O pin and the located I/O pin model;

generating by a programmed processor, an I/O model including each selected I/O pin model within the I/O model;

inputting a generic package parasitic document specifying at least partial package parasitic information for the target device;

selecting at least a portion of the package parasitic information for one or more selected I/O pin models within a particular package parasitic document; and storing the I/O model and particular package parasitic document in a non-transitory processor readable storage medium.

16. The method of claim 15, wherein the set of logical I/O pins includes one or more logical I/O pins to be incorporated into the unsynthesized circuit design at a later time.

17. The method of claim 15, wherein determining a set of logical I/O pins comprises defining a set of logical I/O pins to be incorporated into a complete circuit design.

18. An article of manufacture, comprising:

a non-transitory computer-readable storage medium storing processor- executable instructions causing one or more processors to process a circuit design, the instructions when executed by a processor causing the processor to perform operations including:

determining a set of logical I/O pins of an unplaced and unrouted circuit design;

determining pin placement of one or more of the logical I/O pins of the unplaced and unrouted circuit design on device pins of a target device;

determining an I/O pin profile for each of the logical I/O pins;

inputting a plurality of I/O pin models available for the device pins of the target device, each I/O pin model specifying a different respective set of one or more pin parameter values for simulation of I/O behavior of an I/O pin;

selecting an I/O pin model from the plurality of I/O pin models for each of the logical I/O pins based on pin parameter values of the I/O pin model matching the respective I/O pin profile;

wherein selecting an I/O in model from the plurality of I/O in models for each of the logical I/O pin includes: locating an I/O pin model from the plurality of I/O models having an I/O pin profile matching the determined I/O pin profile of the placed logical I/O pin; and creating an association between the placed logical I/O pin and the located I/O pin model;

generating an I/O model including each selected I/O pin model within the I/O model;

inputting a generic package parasitic document specifying at least partial package parasitic information for the target device;

selecting at least a portion of the package parasitic information for one or more selected I/O pin models within a particular package parasitic document; and storing the I/O model and particular package parasitic document in a non-transitory processor readable storage medium.

* * * * *